Sept. 30, 1958

E. F. GREINER 2,853,733

SHRIMP TREATING MACHINE

Filed Aug. 17, 1956

INVENTOR
ELBERT F. GREINER

BY
ATTORNEYS

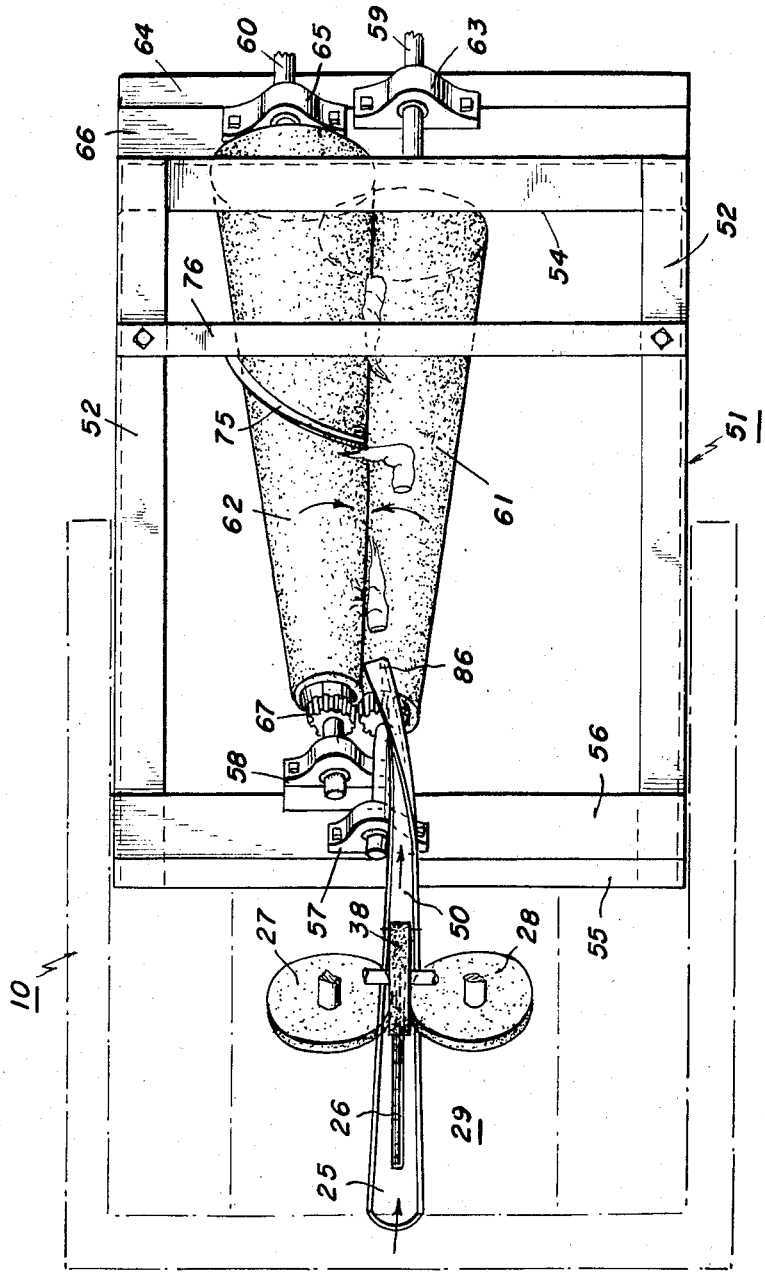

Sept. 30, 1958 E. F. GREINER 2,853,733
SHRIMP TREATING MACHINE
Filed Aug. 17, 1956 3 Sheets-Sheet 3
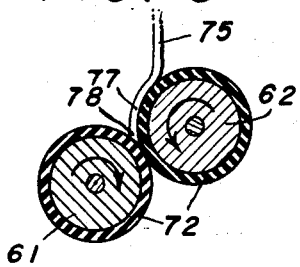
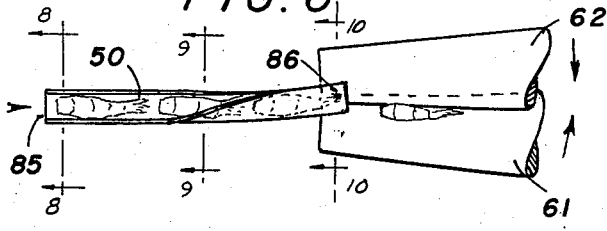
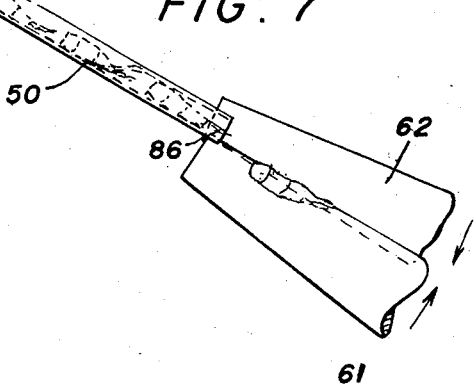
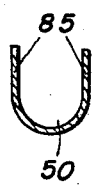
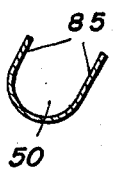
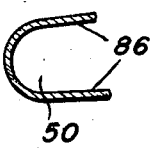
INVENTOR
ELBERT F. GREINER
BY
ATTORNEYS

United States Patent Office 2,853,733
Patented Sept. 30, 1958

2,853,733

SHRIMP TREATING MACHINE

Elbert F. Greiner, New Orleans, La.

Application August 17, 1956, Serial No. 604,832

11 Claims. (Cl. 17—2)

This invention relates to machines for treating shrimp and more particularly to mechanical means for removing the non-edible shell portions from the body meats of shrimp, such machines being commonly called shrimp peelers.

It is the general practice in the shrimp industry to remove the heads from the shrimp bodies promptly after they have been caught, and to later remove the shell portions and also to devein the bodies either before or after they have been shelled. While the present invention may be used to peel or shell deheaded shrimp that have not been deveined, it is especially effective on shrimp that have been deveined on the machine of my Patent No. 2,663,898 of December 29, 1953. In the latter machine the shrimp are fed one at a time on their backs with either their head or tail ends first, to a downwardly inclined chute to which water is supplied, the chute delivering them to driven rolls that yieldably grip the bodies and move them along a cutter which cuts a slit or groove along their backs deep enough to remove the vein. In the present invention the shrimp are fed one at a time to a pair of cone-shaped peeling rolls, and hence the shrimp discharged from the said deveining machine may be fed by a suitable trough or chute to this improved peeling mechanism.

The invention contemplates the use of at least a pair of coacting reversely driven rotary cones with their axes in different elevations but inclined downwardly, together with means for feeding shrimp to the smaller and upper ends of the cones so that the shrimp will be supported on and travel down the lower cone on their sides with their legs and tails directed toward the upper cone and into the crotch formed by the cones, the result being that these shell parts will be gripped and pulled between the cones as the shrimp gravitate toward the larger discharge ends assisted by water supplied to the cones at their upper ends. Since the angle of the crotch varies from the smaller upper ends to the large lower ends of the cones, I have found that by the use of these continuously driven and reversely moving cone shaped rolls, the machine will effectively peel all sizes of shrimp without crushing or damaging the body meats.

Another object of the invention is to provide in a machine of this character means, associated with the crotch of the cone shaped rolls and located about midway of their lengths, for turning the shrimp around end for end while it is supported on the same side on the lower cone, so that all of the legs and about two thirds of the shell will be peeled by the upper portions of the rolls and the remaining portions of the shell at the upper part of the shrimp will be peeled by the lower portions of the rolls as the shrimp travel down such lower portions with their backs disposed toward the crotch. It has been found in practice that a machine having cones of about 18" in length with diameters of about 2⅜" at their small ends and about 5⅛" at their large ends, and with the diverter or reversing means about midway of the length of the cones, will accommodate all sizes of shrimp, the smaller shrimp being caught in the smaller bight of the cones, whereas the larger shrimp travel until they reach a crotch space sufficient to peel them.

Another object is to provide between the deveining mechanism and the peeling mechanism means for giving the shrimp a quarter turn to feed them to the cones with their legs facing the crotch.

Another object is to provide a machine of this character which is simple in construction and highly effective in operation.

With the above and other objects and advantages in view, the invention resides in the novel combinations and arrangements of parts and the novel features of construction hereinafter described and claimed, and illustrated in the accompanying drawing which show the present preferred embodiment of the invention.

In the drawings:

Fig. 2 is a detail top plan view, the electric motor and its support being omitted;

Fig. 3 is a detail cross section through the cone shaped rolls showing the turning or diverter bar associated therewith;

Fig. 4 is a detail perspective view of the diverter bar;

Fig. 5 is a fragmentary detail perspective view of the two rolls and the diverter bar;

Fig. 6 is an enlarged top view of the feeding trough and the adjacent ends of the two rolls;

Fig. 7 is a side view of Fig. 6;

Figure 1:
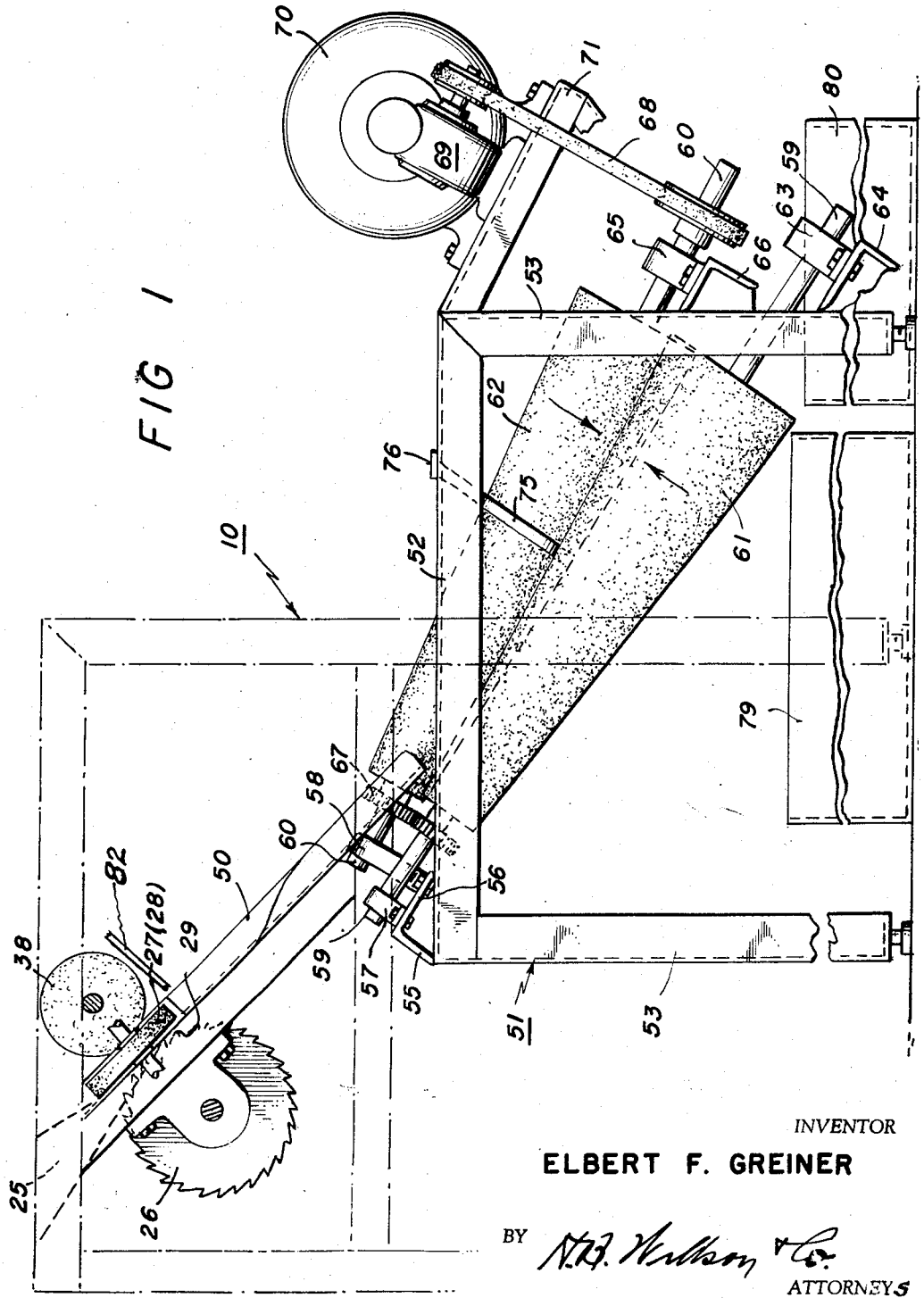
Fig. 1 is a side view of the improved peeling mechanism with parts broken away, the deveining mechanism being diagrammatically shown and with parts in dotted lines.

Figs. 8, 9 and 10 are detail cross sections of the chute for feeding shrimp to the peeling rolls, taken respectively on the lines 8—8, 9—9 and 10—10 in Fig. 6.

For a complete disclosure of the deveining mechanism reference is made to the said Patent No. 2,663,898. It comprises an open upright rectangular frame 10 at the upper front portion of which is a downwardly inclined chute 25 to feed the shrimp one at a time with their backs down to a pair of laterally opposed elastic rolls 27, 28 which grip the opposite sides of the shrimp and move it past a preferably rotary saw 26. The latter projects through a slot in a gage plate 29 and during that movement of the shrimp its body is pressed down against the gage plate and saw by an elastic top roll 38. These parts, numbered as in the patent drawings, are conventionally shown in Figs. 1 and 2.

As the shrimp leave the three rolls, they drop with their backs down from the plates 29 into a trough or chute 50 which feeds them one at a time on their sides to the peeling mechanism. The latter is mounted on an upright open rectangular frame 51 which may be built into the rear portion of the frame 10 and form a part of it. The frame 51 may be made of channel or angle metal bars welded or otherwise fastened and comprises two parallel top side bars 52 from the ends of which depend four supporting legs or corner posts 53. A rear cross bar 54 connects the rear posts and the rear ends of the side bars, and a front cross bar 55 connects the front ends of the side bars. The bar 55 is an inverted angle bar of L-shape in cross section with its ends welded on top of the bars 52 so that its long flange 56 is inclined downwardly and rearwardly for the attachment of self aligning bearings 57 and 58 for the upper ends of two downwardly inclined shafts 59 and 60. These shafts carry coacting cone shaped peeling rolls 61 and 62, and are not only inclined downwardly and rearwardly but also disposed in different planes or elevations. The lower end of the shaft 59 of the lower cone is journaled in a self aligning bearing 63 on one flange of an angle metal cross bar 64 suitably secured to the lower portions of the rear posts 53. The lower portion of the shaft 60 of the upper cone is journaled in a self aligning bearing 65 on a similar angular cross bar 66, as seen in Fig. 1. The two shafts adjacent their upper ends carry meshing toothed gears 67 of equal size so that the two cones will rotate at the same speed in reverse directions. The two spur gears are matched and have slightly beveled teeth because of the angular relation of the two shafts. On the projecting lower end of the shaft 60 is a belt pulley connected by a drive belt 68 to a pulley on the output shaft of speed reduction gearing 69 driven by an electric motor 70. The motor and speed reduction gear are mounted on the inclined upper portion of an angular bracket structure 71 suitably fastened to the rear end of the frame 51.

In the present preferred embodiment of the invention which has been successfully used and which is illustrated in the drawings, the cones 61 and 62 are 18" in length with a diameter of 2⅜" at their small ends and 5⅛" at their large ends, the inclination of the axes of the rolls being 34°. The rolls rotate in the direction of the arrows in Figs. 2 and 3 at a speed of 90 R. P. M., and the vertical spacing of their axes is such that the shrimp are supported on the lower roll 61 with portions resting against the upper roll. The rolls have hard contacting surfaces, and while they may be made of wood, they preferably have a ⅜" covering 72 of vulcanized rubber of 90° hardness, on a core of wood or other material, the two cones being matched by taper grinding after being covered to insure that contact is maintained over the entire length of the cones at all times. Because of the direction of rotation of the rolls, the legs and end of the tail of the shell of the shrimp will be pulled into the bight or crotch along the upper portions of the rolls when the proper crotch size is reached as the shrimp move downwardly by gravity, the motion of the cones and the water which is preferably supplied to the feed chute 50.

About two-thirds of the shell of the lower part of the shrimp are removed with the legs and tail, and the remaining portions of the shell along the back of the shrimp are removed by reversing the position of the shrimp end for end so that it travels down the lower portion of the cones with its back toward the crotch. The turning or reversing of the shrimp is done by a diverter bar 75 depending from a cross bar 76 fastened to the side bars 52. This shrimp turning or reversing means may be a 3/16" square metal bar with its lower portion 77 curved to the contour of the upper roll and with its extremity 78 pointed and ground to the contour of the crotch at about midway the length of the cones. As will be seen on reference to Fig. 2, when the leading end of the shrimp contacts the diverter bar, the shrimp is momentarily halted but its momentum plus the water turns or trips the shrimp around on its side causing it to travel down the lower portion of the rolls or cones with its back toward the crotch. When the proper crotch size is reached the shell portions along the back are pulled off of the slippery meats and pass through the rolls. While the shrimp may be fed to both the deveining mechanism and the peeling mechanism with either their tail ends or their head ends first, it has been found that operators of these machines prefer to feed the shrimp tail first. However regardless of which end is fed first the result is the same. All of the shell portions drop into a suitable receptacle 79 disposed beneath the rolls and the meats drop off of the lower ends of the rolls into a suitable receptacle 80.

The rolls or cones accommodate all sizes of shrimp but in order to peel shrimp without damage to the meats, a definite relationship between the size of the shrimp and the size of the crotch space must be maintained. Excellent results have been obtained by the use of cones of the size above stated but cones longer than 18" may be used provided the end diameters are maintained somewhat near those above specified. The 34° angle of inclination of the cones is not too critical but it has been found that if the angle is less more water must be used to assist the movement of the shrimp. The water is preferably fed to the rolls by a 3/16" tube 82 which is suitably supported and discharges into the upper end of the chute 50. The water, of course, assists the movement of the shrimp down both the chute and the cones.

The chute 50 may be made of metal or plastic and may be fastened to either of the frames 10 or 51 or both. At its upper end it is U-shaped in cross section having a width of approximately 1¼" and a height of 2". About midway of the length of this trough, it is gradually twisted a quarter turn toward the crotch of the cones so that its side walls, which are vertical at its upper end as shown at 85 in Fig. 8, become almost horizontal as shown at 86 in Fig. 10. Hence as the shrimp slide down the chute on their backs, the spiral effect turns them on their sides causing them to discharge on the cones with the under or leg side facing the crotch.

Since the size of the crotch between two cones varies, I have found that the use of cones rather than cylindrical rolls, permits all sizes of shrimp to be peeled by a single pair of cones without damage to the meats. The shrimp progress down the lower cone until the proper crotch size is reached to accommodate the individual size of the shrimp. It is therefore unnecessary to use mechanical means to force the shrimp into the bight of the cones. The shrimp travel rapidly because they are supported on the lower roll and not in the crotch as would be the case if the two cones are in the same plane, and also because the shrimp are pulled into the bight of the cones only at the moment of peeling. It is important that the shrimp travel with sufficient speed to keep pace with the deveining mechanism.

To completely peel shrimp by the use of the two cones an abutment means such as the diverter bar must be used to reverse the position of the shrimp on the lower cone. By tests I have found that about 75 percent of the shell parts are removed before the shrimp reach the diverter bar; and by shell parts I mean tails and legs as well as shell portions on the body meats. The shell parts on the body meats pull off in pieces and the mere pulling off of the legs does not remove shell parts on the body meats. The legs contain a small amount of meat united to the body meats and they pull off separately. When the shrimp reach the diverter bar, the tails, legs and about two thirds of the shell on the body meats have been removed. It is therefore necessary to turn the shrimp end for end so that the remaining shell parts on the backs or top portions of the shrimp may be caught in the nip of the larger lower portions of the cones and pinched off. I have also found that cones as short as 18 inches will do a complete peeling job on all sizes of shrimp, but the cones may be as long as 36 inches and their diameters may vary from 1⅛" to 2⅛" at their small ends and from 5⅛" to 7⅛" at their large ends. I have found that if cones longer than 18 inches are used, the shrimp are completely peeled long before the meats drop off of the ends of the rolls. It may be further noted that since the surfaces of the cones are normally in contact, the shell parts will be effectively gripped and crushed in the nip of the cones and drawn through them, that being possible because of the surfaces of the cones and the mounting of the latter.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. In a shrimp peeling machine, a pair of rotary cones having their axes inclined downwardly from the small to the large ends of the cones, said axes being also disposed at different elevations with the peripheral surfaces of the cones substantially in contact to provide a crotch which varies in size from one end to the other of the cones, whereby shrimp deposited one at a time upon the small upper end of the lower cone will gravitate downwardly with their sides resting on and supported by the lower cone and with other portions merely resting against the upper cone, projection means disposed at the crotch intermediate the ends of the cones to engage the advancing ends of the downwardly gravitating shrimp and reverse their positions end for end with the same side of the shrimp resting on the lower cone and means operatively associating with the cones for rotating them in opposite directions and downwardly at the crotch to cause shell portions of the shrimp to be gripped by the cones when the proper crotch size is reached and to be pulled from the meat portions of the shrimp and crushed as they pass between the cones.

2. A shrimp peeling machine as claimed in claim 1 in which said projection means comprises a stationary bar having a portion curved to conform to the shape of an adjacent portion of one of the cones and a free end shaped to conform with the adjacent portion of the crotch.

3. A shrimp peeling machine as claimed in claim 1 in combination with means for feeding shrimp one at a time to the lower cone, the last mentioned means comprising an inclined chute of substantially U-shape in cross section and of a size to permit one shrimp at a time to gravitate down the chute, the upper inlet end of the chute having its open side disposed uppermost and the lower discharge end of the chute being disposed over the upper end of the lower cone and having its open side turned toward the upper cone to deposit the shrimp on their sides upon the lower cone.

4. A shrimp peepling machine as claimed in claim 3 in combination with means to discharge water into the upper portion of the chute.

5. A shrimp peeling machine as claimed in claim 1 in combination with means to supply water to the upper end of the crotch to assist the shrimp in their movement down the cones.

6. A shrimp peeling machine as claimed in claim 1 in which said cones have a diameter at their small upper ends of not less than 1⅜" and at their large lower ends of not more than 7⅛".

7. A shrimp peeling machine as claimed in claim 6 in which said cones have a length of not more than 36".

8. A shrimp peeling machine as claimed in claim 1 in which said cones have a length of approximately 18 inches and a diameter of approximately 2⅜" at their small upper ends and of approximately 5⅛" at their large lower ends.

9. In a machine for peeling all sizes of shrimp, a pair of rolls of cone shape, means associated with the rolls and mounting them for rotation with their surfaces substantially in contact and with their axes inclined downwardly from their small ends, one of said rolls being disposed at a higher elevation than the other, whereby shrimp placed one at a time on their sides on the upper portion of the lower roll with their legs turned toward the crotch of the rolls will travel down the rolls supported upon the lower one and merely resting against the upper one, means associated with the rolls for continuously rotating them in opposite directions causing their nip portions to grip the shell parts of shrimps and pull the same through the rolls, a stationary diverter member projecting into the crotch of the rolls at a point approximately midway of their lengths to cause the shrimp to be turned end for end while they remain on the same side, and means associated with the upper ends of the rolls to supply water to the latter.

10. The combination of claim 9 in which the last mentioned means comprises a shrimp and water feeding chute of substantially U-shape in cross section to support shrimp in it on their backs, said chute being inclined downwardly toward the upper ends of the rolls and the lower part of said chute having a quarter turn or twist to discharge shrimp on their sides onto the lower roll and against the upper one, and a water supply element associated with the upper end of the chute to supply water thereto.

11. In a shrimp peeler a pair of continuously rotating and contacting peeling cones with their axes inclined downwardly from the small ends of the cones and with one cone disposed at a higher elevation than the other, whereby shrimp passing down the cones will be supported on their sides upon the lower cone while resting against the upper one, means associated with the upper ends of the cones to feed shrimp thereto one at a time on their sides with their legs turned toward the crotch of the cones, and abutment means associated with the cones and extending into the crotch of the cones at a point approximately midway of their lengths to reverse the positions of the shrimp end for end while they remain on the same side and to dispose their back portions toward the crotch of the cones.

References Cited in the file of this patent

UNITED STATES PATENTS

| | | |
|---|---|---|
| 2,004,581 | Meyer | June 11, 1935 |
| 2,112,230 | Fisher | Mar. 29, 1938 |
| 2,574,044 | Lapeyre et al. | Nov. 6, 1951 |

FOREIGN PATENTS

| | | |
|---|---|---|
| 157,400 | Australia | July 5, 1954 |